United States Patent
Falk et al.

[11] Patent Number: 6,025,309
[45] Date of Patent: Feb. 15, 2000

[54] POLYMERIC ACETALS OF HYDROXYCARBOXYLIC ACIDS AND THEIR DERIVATIVES, AND A PROCESS FOR THEIR PREPARATION

[75] Inventors: Uwe Falk, Bruchköbel; Peter Klug, Grossostheim; Frank Weinelt, Burgkirchen, all of Germany

[73] Assignee: Clariant GmbH, Frankfurt, Germany

[21] Appl. No.: 08/926,410

[22] Filed: Sep. 9, 1997

[30] Foreign Application Priority Data

Sep. 10, 1996 [DE] Germany ............... 196 36 688

[51] Int. Cl.[7] .................................. C10M 145/20
[52] U.S. Cl. .................. 508/452; 528/266; 528/277; 528/332; 508/453; 508/454; 525/418; 525/450
[58] Field of Search .................. 508/452, 453, 508/454; 525/418, 450; 528/266, 277, 332

[56] References Cited

U.S. PATENT DOCUMENTS

| | | | |
|---|---|---|---|
| 4,438,253 | 3/1984 | Casey et al. | 528/86 |
| 5,202,413 | 4/1993 | Spinu | 528/354 |
| 5,620,949 | 4/1997 | Baker et al. | 508/452 |
| 5,651,817 | 7/1997 | Yamato et al. | 528/127 |

FOREIGN PATENT DOCUMENTS

| | | |
|---|---|---|
| 0 512 501 A2 | 11/1992 | European Pat. Off. . |
| 0 780 348 A1 | 6/1997 | European Pat. Off. . |
| 196 16 339 | 10/1997 | Germany . |
| 453833 | 9/1936 | United Kingdom . |

*Primary Examiner*—Jacqueline V. Howard
*Attorney, Agent, or Firm*—Miles B. Dearth

[57] ABSTRACT

The present invention relates to polymeric acetals containing the recurring structural unit (I)

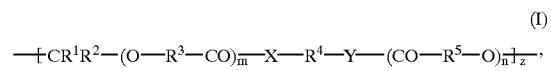

where the substituents and numbers are as defined in the description. These polymeric acetals are suitable as base components for water-soluble cooling lubricants.

12 Claims, No Drawings

POLYMERIC ACETALS OF HYDROXYCARBOXYLIC ACIDS AND THEIR DERIVATIVES, AND A PROCESS FOR THEIR PREPARATION

Dimeric fatty acid derivatives are important products in the plastics, petroleum, lubricant and fiber sectors (J. Am. Oil Chem. Soc. 1979, 56, A 782). They are used, for example, as plasticizer components, as monomer building blocks for polyamides, surfactants, corrosion-inhibitors and fiber sizes. Despite their high molecular weight, they are generally characterized by the fact that they are liquid and have relatively low viscosities. Furthermore, dimeric fatty acid derivatives are very temperature-stable. A disadvantage for many applications, however, for ecological reasons, is their inadequate biological degradability. This is due to the direct linking of two fatty acid groups by carbocyclic rings or carbon bridges, which makes microbial attack difficult. It is clear from the above that it would be desirable to prepare biodegradable compounds which have dimeric fatty acid properties.

German Patent Application 196 16 339.0 discloses how, by acetalation of hydroxystearic acid derivatives, dimeric esters and amides can be obtained which have the property profile of dimeric fatty acid derivatives, but which have significantly improved biodegradability. A disadvantage, however, is their relatively high volatility.

The object of the present invention was therefore to prepare polymers with these property profiles which, compared with their monomeric counterparts, are characterized by lower evaporation rates on heating.

Surprisingly, this has been achieved by firstly condensing hydroxy acids with diols, diamines or aminoalcohols in various molar ratios, to give a dihydric alcohol containing ester or amide groups, with the elimination of water, and then reacting the alcohol with aldehydes, or substances which release aldehydes under the reaction conditions, to give the corresponding acetal, with removal of the water of reaction. In this way, polyacetals are obtained which additionally contain ester or amide groups. The acetal function is stable above pH 7, but can, depending on use, be cleaved in the acidic pH range with the re-formation of hydroxy acid derivatives, thus permitting biodegradation of the product. The products generally have molecular weights of approximately 1000–20,000 g/mol and in some cases are thixotropic oils of varying viscosity.

The invention thus relates to polymeric acetals containing the recurring structural unit (I)

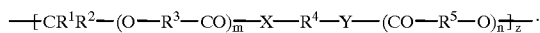

(I)

$R^1$ and $R^2$ are, independently of one another, H, a branched or unbranched, saturated or unsaturated $C_1$–$C_{12}$-alkyl radical, or a phenyl or naphthyl radical. Preference is given to H, $C_1$–$C_4$-alkyl and phenyl.

$R^3$ and $R^5$ are, independently of one another, a branched or unbranched, substituted or unsubstituted $C_1$–$C_{30}$-alkylene or $C_2$–$C_{30}$-alkenylene radical, a phenylene radical or a naphthalene radical. Preference is given to $C_5$–$C_{20}$-, in particular $C_{17}$-alkylene or alkenylene.

$R^4$ is a branched or unbranched $C_1$–$C_{200}$-, preferably $C_2$–$C_{50}$-alkylene or cycloalkylene radical, which may be interrupted by O, or a $C_6$–$C_{200}$-arylene or alkylarylene radical, where these radicals may be substituted by heteroatoms such as F, Cl, Br or I, or interrupted by heteroatoms such as oxygen, sulfur or nitrogen, preferably oxygen.

X and Y are, independently of one another, O or $NR^6$, preferably O, where $R^6$ is either H or a branched or unbranched $C_1$–$C_{30}$-alkyl or cycloalkyl radical or a $C_6$–$C_{50}$-aryl or $C_7$–$C_{50}$-alkylaryl radical, preferably H or a $C_1$–$C_4$-alkyl radical.

n and m are numbers from 0 to 10, preferably from 0 to 5; if $X=NR^6$, m is not 0 and if $Y=NR^6$, n is not 0; in addition the sum of n and m is greater than 0, preferably 1 to 5.

z is a number from 2 to 100, preferably from 3 to 20.

The acetals according to the invention are suitable as base components for water-soluble cooling lubricants.

The invention also relates to a process for preparing these polyacetals in which either hydroxycarboxylic acids of the formula HO—$R^3$—COOH or HO—$R^5$—COOH or mixtures of such acids are condensed with diols, aminoalcohols or diamines of the formula HY—$R^4$—XH or mixtures of these components, and the resultant products, which contain two free OH groups, are reacted with an aldehyde or ketone of the formula $R^1R^2CO$ with acid catalysis to give the polyacetal or firstly a hydroxycarboxylic acid is acetalated using an aldehyde or ketone to give an acetaldicarboxylic acid, which is then esterified or amidated using a diol, diamine or aminoalcohol or mixtures thereof or an acetaldicarboxylic acid ester of a $C_1$–$C_4$-monoalcohol is transesterified or transamidated with polymerization using a diol, diamine or alkanolamine or mixtures thereof.

Suitable hydroxycarboxylic acids for the preparation of the polyacetals according to the invention are saturated and unsaturated, branched or unbranched $C_2$–$C_{31}$-hydroxycarboxylic acids containing a primary or secondary hydroxyl group, such as glycolic acid, lactic acid, 4-hydroxybenzoic acid, 4-hydroxybutanoic acid, 5-hydroxypentanoic acid, 6-hydroxyhexanoic acid, 12-hydroxystearic acid, or ricinoleic acid, or hydroxy fatty acids which are obtained by oxidation of unsaturated fatty acids. Lactic acid, 12-hydroxystearic acid and ricinoleic acid and their technical grades obtained, for example, from castor oil are particularly suitable. Also suitable are the corresponding lactones of hydroxy acids, such as y-butyrolactone or caprolactone, since these react with diols, with transesterification and ring opening, to give the aforementioned intermediates.

The synthesis of hydroxy fatty acid esters is essentially described in the literature; Ind. Eng. Chem. 1953, 45, 1777 and the U.S. Pat. Nos. 2,397,008, 2,385,849 and 2,390,027 may be cited as examples. The condensation of the hydroxy fatty acid with the corresponding alcohol is preferably carried out with acid catalysis and azeotropic removal of the water of reaction with a suitable solvent at 40–140° C., in particular 60–110° C. Suitable solvents are, for example, saturated and aromatic, acyclic and cyclic hydrocarbons, such as petroleum spirit, cyclohexane, toluene or xylene. Suitable diol components are aliphatic, cycloaliphatic or aromatic dialcohols, whose alkyl chains can be interrupted by further heteroatoms, in particular oxygen atoms. Suitable alcohols are, for example, ethylene glycol, neopentyl glycol, hexanediol, diethylene glycol, triglycol and tetraglycol, and, generally, polyglycols or mixed polyglycols with proportions of propylene or butylene groups. Suitable catalysts for the esterification are strong sulfonic acids or mineral acids, such as, for example, p-toluene sulfonic acid, methanesulfonic acid, sulfuric acid and phosphoric acid, and acidic ion exchangers, particular preference being given to sulfuric acid and methanesulfonic acid in concentrations of 0.01–2%, preferably 0.1–1.0% by weight, based on the total weight of alcohol and hydroxy fatty acid.

Hydroxycarboxylic acid amides or hydroxycarboxylic acid amide esters are synthesized from a hydroxycarboxylic acid and a diamine or aminoalcohol with or without catalyst by heating the components without a diluent to 150–220° C. or with azeotropic removal of the water of reaction with a suitable solvent at 100–220° C., in particular 150–200° C. Suitable solvents are, for example, saturated and aromatic, acyclic and cyclic hydrocarbons, such as petroleum spirit, cyclohexane, toluene, xylene or solvent naphtha. Suitable amines are, for example, aliphatic, cyclic and aromatic diamines, whose alkyl radical may contain further heteroatoms. Examples are primary diamines such as ethylenediamine, propylenediamine, hexamethylenediamine and phenylenediamine. Suitable aminoalcohols are, for example, aminoethanol, diglycolamine or aminopropanol.

Acetalation of the condensation products formed from the hydroxy acid and the diol/diaminelamino alcohol with the corresponding aldehydelketone is carried out under acid catalysis with or without a solvent, preferably with azeotropic removal of the water of reaction with a suitable solvent at 40°–140° C.

Suitable aldehyde components are, for example, aliphatic aldehydes, such as formaldehyde, acetaldehyde, trichloroacetaldehyde, propionaldehyde, butyraldehyde, isobutyraldehyde, isononylaldehyde and dodecanal, aromatic aldehydes, such as benzaldehyde and naphthaldehyde, and compounds which can release such aldehydes under the reaction conditions, such as, for example, trioxane or paraformaldehyde, the trimeric and tetrameric forms of acetaldehyde and dialkyl acetals. Particularly suitable aldehydes are formaldehyde and paraformaldehyde, which permit complete conversion to the acetal. Also suitable are solutions, in particular aqueous solutions of aldehydes, for example formalin solution. These aldehydes are used in virtually equimolar or superstoichiometric quantity, the excess being unimportant, in particular 70–130% of the theoretical amount.

Suitable solvents are, for example, saturated and aromatic, acyclic and cyclic hydrocarbons, such as petroleum spirit, cyclohexane, toluene or xylene; suitable catalysts for the acetalation are, for example, p-toluenesulfonic acid, methanesulfonic acid, sulfuric acid, phosphoric acid and acidic ion exchangers, particular preference being given to sulfuric acid and methanesulfonic acid in concentrations of 0.01–2%, preferably 0.1–1.0% by weight, based on the hydroxy fatty acid derivative used.

The acetal formation which takes place can be monitored via the amount of water collected in the water separator and generally leads to the formation of the theoretical amount of condensed water.

The acetalation step is followed by neutralization of the catalyst component of the reaction mixture in order to prevent hydrolysis of the acetal formed. For the neutralization, metal hydroxides and metal alkoxides, in particular sodium hydroxide, potassium hydroxide, potassium tert-butoxide, sodium methoxide or methanolic sodium methoxide solution are suitable.

Starting from hydroxy acids, the acetals according to the invention can be prepared in various ways.

Firstly, the conversion of the hydroxy acids to acetals of hydroxy acid esters or hydroxy acid amides or hydroxy acid amide esters can take place as described above in two steps, firstly with esterification or amidation of hydroxy acids to give the ester or diamide or amide ester, their isolation and subsequent acetalation. In the case of polyacetal esters, these steps can be carried out in one reaction vessel in a one-pot reaction. The same reaction vessel and the same catalyst are used for the esterification and acetalation step.

Alternatively, acetals of hydroxy acid esters and dihydroxy acid amides can be obtained by firstly obtaining the acetal from the corresponding hydroxy acid or a mixture of hydroxy acids and, in a second step, reacting this with a suitable diol or diamine to give the corresponding polyacetal esters and/or amides.

Another possibility is the synthesis of a hydroxy fatty acid ester of a $C_1$–$C_4$-alcohol, such as methanol, ethanol, propanol or butanol (for example methyl 12-hydroxystearate), its subsequent acetalation to give the corresponding ester acetal (Example 2a) and subsequent transesterification or transamidation using a diol or aminoalcohol or diamine to give the desired polymeric end product (Example 2b). This method is particularly suitable for the synthesis of polyalkylamides of acetaldicarboxylic acids.

The invention is explained in more detail with reference to the following examples. Viscosities were measured using a Bohlin rheometer at a shear rate of 10 s$^{-1}$. The average molecular weights were determined using gel permeation chromatography (polystyrene as standard). The percentages are, unless stated otherwise, to be understood to mean % by weight.

EXAMPLE 1

General instructions for the synthesis of polymeric acetal esters:

The corresponding hydroxy acid and the corresponding diol dissolved in cyclohexane (circa 50% strength solution) and 0.4% of conc. sulfuric acid (based on the diol and hydroxy acid) are placed in a four-necked flask fitted with stirrer and water separator. The mixture is refluxed (80–90° C.) and water is removed by azeotropic distillation until a residual acid value of <2 mg KOH/g has been reached. A total of 70–130 mol % (based on the diol) of paraformaldehyde is then added in 5 portions over the course of 2 hours, the theoretical quantity of water of reaction being removed azeotropically. The mixture is then stirred for a further 2 hours at 80–90° C., neutralized using 30% methanolic sodium methoxide solution until a pH of 9 has been reached and filtered with the addition of filtration auxiliaries, and the solvent is distilled off, giving yellowish oils.

EXAMPLE 1a

Polymer of 12-hydroxystearic acid/PEG 400/paraformaldehyde

Starting from 156.6 g (0.50 mol) of technical-grade hydroxystearic acid, 100.0 g (0.25 mol) of polyethylene glycol 400 and 9.76 g (0.325 mol) of paraformaldehyde, 231.6 g of a yellowish oil were obtained. Average molecular weight: 8900 Viscosity: 2.8 Pas (25° C.)

EXAMPLE 1b

Polymer of 12-hydroxystearic acid/PEG 400/paraformaldehyde

Starting from 156.6 g (0.50 mol) of technical-grade hydroxystearic acid, 200 g (0.50 mol) of polyethylene glycol 400 and 19.6 g (0.65 mol) of paraformaldehyde, 312.6 g of a yellowish oil were obtained. Average molecular weight: 9800 Viscosity: 3.9 Pas (25° C.)

EXAMPLE 1c

Polymer of 12-hydroxystearic acid/PEG 400/paraformaldehyde

Starting from 156.6 g (0.50 mol) of technical-grade hydroxystearic acid, 100 g (0.25 mol) of polyethylene glycol 400 and 7.50 g (0.25 mol) of paraformaldehyde, 140.9 g of a yellowish oil were obtained. Average molecular weight: 3600 Viscosity: 1.27 Pas (25° C.)

EXAMPLE 1d

Polymer of lactic acid/PEG 400/paraformaldehyde

Starting from 50.4 g (0.50 mol) of 90% lactic acid, 100 g (0.25 mol) of polyethylene glycol 400 and 9.76 g (0.325 mol) of paraformaldehyde, 123 g of a yellowish oil were obtained. Average molecular weight: 1900 Viscosity: 0.82 Pas (25° C.)

EXAMPLE 1e

Polymer of 4-hydroxybenzoic acid/PEG 400/ paraformaldehyde Starting from 69.1 g (0.50 mol) of 4-hydroxybenzoic acid, 100 g (0.25 mol) of polyethylene glycol 400 and 9.76 g (0.325 mol) of paraformaldehyde, 128 g of a viscous oil were obtained. Average molecular weight: 900 Viscosity: 16.3 Pas (40° C.)

EXAMPLE 1f

Polymer of 12-hydroxystearic acid/lactic acid/PEG 400/ paraformaldehyde

Starting from 78.3 g (0.25 mol) of technical-grade hydroxystearic acid, 25.0 g (0.25 mol) of 90% lactic acid, 100 g (0.50 mol) of polyethylene glycol 400 and 9.76 g (0.325 mol) of paraformaldehyde, 185.4 g of a yellowish oil were obtained. Average molecular weight: 6200 Viscosity: 1.8 Pas (25° C.)

EXAMPLE 1g

Polymer of 12-hydroxystearic acid/1,6-hexanediol/ paraformaldehyde

Starting from 150.2 g (0.50 mol) of technical-grade hydroxystearic acid, 29.6 g (0.25 mol) of 1,6-hexanediol and 9.76 g (0.325 mol) of paraformaldehyde, 169.7 g of a colorless oil were obtained. Average molecular weight: 4900 Viscosity: 5.8 Pas (25° C.)

EXAMPLE 1h

Polymer of caprolactone/PEG 400/paraformaldehyde 57.1 g (0.50 mol) of caprolactone and 100 g (0.25 mol) of polyethylene glycol 400 were heated at 100° C. for 5 hours with the addition of 0.4% conc. sulfuric acid in cyclohexane and the resulting ester mixture was acetalated as above using 9.76 g (0.325 mol) of paraformaldehyde. 149.2 g of a yellowish oil were obtained. Average molecular weight: 10,800 Viscosity: 4.95 Pas (25° C.)

EXAMPLE 1i

Polymer of 12-hydroxystearic acid/PEG 400/ paraformaldehyde

Example 1a is repeated but instead of adding paraformaldehyde, 27.9 9 (0.325 mol) of a 35% strength aqueous formalin solution are added dropwise. 235 g of a yellowish oil are obtained. Viscosity: 4.7 Pas (25° C.)

EXAMPLE 2

Synthesis of polymeric amide acetals by transesterification of the corresponding methyl ester acetal

EXAMPLE 2a (Synthesis of the Precursor)

12-Methyl hydroxystearate formal Dimethyl 13,15-dioxa-12,16-di-n-hexyl-heptacosandioate

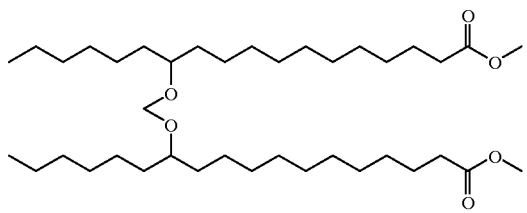

178.2 g (0.50 mol) of methyl 12-hydroxystearate and 0.36 g of p-toluenesulfonic acid monohydrate (0.2%) are dissolved in 250 ml of cyclohexane at 80° C. in a 1 l four-neck flask with water separator. The solution is heated to reflux at an internal temperature of 87° C. and then a total of 9.76 g (0.325 mol, 130 mol %) of paraformaldehyde is added in 5 portions over the course of 2 hours, the theoretical amount of water being eliminated. The solution is then stirred for a further 2 hours at 80° C. The crude solution is adjusted to pH 9 using 1.61 g of 30% methanolic sodium methoxide solution, and filtered using filtration auxiliaries. The solvent is distilled off in vacuo at 80° C./30 mm. Yield: 179.0 g (98.8%) of a cloudy oil, acid value 2.0 mg KOH/g, viscosity (Bohlin, D=10s$^{-1}$, 25° C.)=113 mPas.

EXAMPLE 2b

Polymer with ethylenediamine (two-pot method)

160.3 g of methyl 12-hydroxystearate formal from Example 2a and 15.0 g (0.25 mol) of ethylenediamine are combined in 85 g of diethylene glycol dimethyl ether and heated to 155° C. for 8 hours without removal of distillate. Methanol was then distilled off via a short Vigreux column with integral column head over the course of 31 h and, finally, the solvent was distilled off at 200–250° C. Yield: 166.8 g of a brownish, wax-like solid.

EXAMPLE 3

Polymeric ester acetal of caprolactone/PEG 200/ benzaldehyde 57.1 g (0.50 mol) of ε-caprolactone, 50.5 g (0.25 mol) of 1,12-dodecanediol and 0.43 g of conc. H$_2$SO$_4$ are introduced into 108 g of cyclohexane and the mixture is heated to 80° C. for 5 hours. 27.5 g (0.26 mol) of benzaldehyde were then added and a total of 3.9 ml of water were removed azeotropically at 88° C. over the course of 7.5 h via the water separator. The solution was neutralized at 25° C. using 1.1 g of 30% methanolic sodium methoxide solution and filtered using filtration auxiliaries, and the solvent was distilled off at 90° C./25 mb. Yield: 92.7 g of a colorless oil. Viscosity: 9.0 Pas (25° C.) Average molecular weight: 5600

EXAMPLE 4

12-Hydroxystearic acid/diglycolamine/HCHO=2:1:1

A 1 l four-neck flask with water separator was charged with 156.6 g (0.50 mol) of technical-grade 12-hydroxystearic acid, 0.73 g of conc. H$_2$SO$_4$ and 10 g of cyclohexane; 26.1 g (0.25 mol) of diglycolamine were added and the mixture was heated to 170–180° C. for 20 hours, the theoretical amount of water being removed azeotropically. Condensation was then carried out for a further 3 hours at 120° C./50 mb. A wax-like solid having a base nitrogen content of 0.02% was obtained. This was dissolved in 183 g of cyclohexane at 84° C., 0.73 g of conc. H$_2$SO$_4$ were added, as were a total of 9.76 g (0.325 mol) of paraformaldehyde in five portions over the course of 2 hours and the mixture was stirred for a further 2 hours. It was neutralized using 4.5 g of 30% methanolic sodium methoxide solution and filtered using filtration auxiliaries and the solvent was distilled off at 90° C./25 mb. Yield: 145.8 g of a highly-viscous oil. Viscosity: 33.9 pas (60° C.) Average molecular weight: 4900

We claim:

1. A polymeric acetal with the repeat structural unit (I)

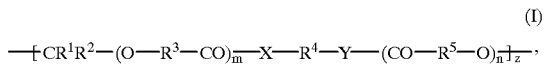

wherein

R$^1$ and R$^2$ are, independently of one another, H, a branched or unbranched, saturated or unsaturated C$_1$–C$_{12}$-alkyl radical or a phenyl or naphthyl radical, R$^3$ and R$^5$ are, independently of one another, a branched or unbranched, substituted or unsubstituted C$_1$–C$_{30}$-alkylene or C$_2$–C$_{30}$-alkenylene radical, a phenylene radical or a naphthylene radical, R$^4$ is a branched or unbranched C$_1$–C$_{200}$-alkylene or cycloalkylene radical, a C$_6$–C$_{200}$-arylene or alkylarylene radical, where these radicals may be substituted by heteroatoms such as F, Cl, Br or 1 or can be interrupted by heteroatoms such as oxygen, sulfur or nitrogen, X and Y are, independently of one another, either O or NR$^6$, where R$^6$ is either H or a branched or unbranched C$_1$–C$_{30}$-alkyl or cycloalkyl radical or a C$_6$–C$_{50}$-aryl or C$_7$–C$_{50}$-alkylaryl radical, n and m are numbers from 0 to 10, the sum of which is greater than 0, and if X=NR$^6$, the number m is not 0 and if Y=NR$^6$, the number n is not 0, and z is a number from 2 to 100.

2. A polymeric acetal as claimed in claim 1, wherein

R$^1$ and R$^2$ are, independently of one another, H, a branched or unbranched, saturated or unsaturated C$_1$–C$_4$-alkyl radical or a phenyl radical, R$^3$ and R$^5$ are, independently of one another, a branched or unbranched, substituted or unsubstituted C$_5$–C$_{20}$-alkylene or alkenylene radical, R$^4$ is a branched or unbranched C$_2$–C$_{50}$-alkylene radical, which may be interrupted by oxygen, X and Y are oxygen, n and m are numbers from 0 to 5, the sum of which is 1 to 5, and z is a number from 3 to 20.

3. A polymeric acetal as claimed in claim 1, wherein R$^1$ and R$^2$ are hydrogen.

4. A process for the preparation of the polymeric acetal of claim 1, which comprises condensing an ester, amide ester or amide of a hydroxycarboxylic acid with an aldehyde or a ketone to give the polyacetal or, after acetalation of a hydroxycarboxylic acid using an aldehyde or ketone to give the acetaldicarboxylic acid, esterifying or amidating the latter using a diol, an aminoalcohol or a diamine or mixtures thereof, or reacting an ester of a hydroxycarboxylic acid and a C$_1$–C$_4$-alcohol with an alcohol or ketone to give the acetal ester and transesterifying or transamidating the latter using a diol, an amino alcohol or a diamine or mixtures thereof.

5. The process for the preparation of the polymeric acetal of claim 1, wherein an ester of one or more hydroxycarboxylic acids of the formula HO—R$^3$—COOH or HO—R$^5$—COOH and one or more diols of the formula HO—R$^4$—OH is condensed with an aldehyde or a ketone of the formula (R$^1$, R$^2$)CO with elimination of water to give the polyacetal.

6. The process as claimed in claim 4, wherein the base hydroxycarboxylic acid is ricinoleic acid or 12-hydroxystearic acid.

7. The process as claimed in claim 4, wherein the base diol is polyethylene glycol or a polyethylene glycol-polyalkylene glycol copolymer or a mixture thereof of the formula HO—(CHR$^7$—CH$_2$O)$_a$(CH$_2$CH$_2$O)$_b$H, where R$^7$ is methyl or ethyl and a and b are, independently of one another, a number from 1 to 50.

8. The process as claimed in claim 4, wherein an amide ester of a hydroxycarboxylic acid and an aminoalcohol is condensed with an aldehyde or a ketone with elimination of water to give the polyacetal.

9. The process as claimed in claim 4, wherein an amide of a hydroxycarboxylic acid and a diamine is condensed with an aldehyde or a ketone with elimination of water to give the polyacetal.

10. The process as claimed in claim 4, wherein a suitable hydroxycarboxylic acid is firstly acetalated using an aldehyde or ketone to give the acetaldicarboxylic acid, which is then esterified or amidated using a diol, an amino alcohol or a diamine or mixtures thereof.

11. The process as claimed in claim 4, wherein a hydroxycarboxylic acid ester of a C$_1$–C$_4$-alcohol is firstly reacted with an alcohol or ketone to give the acetal ester which, with elimination of the C$_1$–C$_4$-alcohol, is transesterified or transamidated using a diol, an aminoalcohol or a diamine or mixtures of one or more of these components under alkaline conditions.

12. A method of preparing water-soluble cooling lubricants, the method comprising incorporating the polymeric acetal composition of claim 1 as a base component into a water-soluble cooling lubricant.

* * * * *